US005193214A

United States Patent [19]

Mardus et al.

[11] Patent Number: 5,193,214

[45] Date of Patent: Mar. 9, 1993

[54] VEHICULAR RADIO RECEIVER WITH STANDARD TRAFFIC PROBLEM DATABASE

[75] Inventors: Claus Mardus, Bad Salzdetfurth; Ralf Duckeck; Peter Brägas, both of Hildesheim, all of Fed. Rep. of Germany

[73] Assignee: Robert Bosch GmbH, Stuttgart, Fed. Rep. of Germany

[21] Appl. No.: 803,570

[22] Filed: Dec. 9, 1991

Related U.S. Application Data

[63] Continuation of Ser. No. 459,141, Dec. 29, 1989, abandoned.

[51] Int. Cl.[5] .......... H04B 7/00; G08G 1/09

[52] U.S. Cl. .......... 455/54.2; 455/186.1; 340/905; 340/988

[58] Field of Search .......... 455/186, 154, 156–158, 455/45, 54, 56, 345, 228; 340/825.73, 905, 988, 992

[56] References Cited

U.S. PATENT DOCUMENTS

| | | | |
|---|---|---|---|
| 3,949,401 | 4/1976 | Hegeler | 343/200 |
| 4,380,821 | 4/1983 | Eckhardt | 455/33 |
| 4,435,843 | 3/1984 | Eilers et al. | 455/205 |
| 4,450,589 | 5/1984 | Eilers et al. | 455/205 |
| 4,499,603 | 2/1985 | Eilers | 455/205 |
| 4,862,513 | 8/1989 | Bragas | 455/45 |
| 4,888,699 | 12/1989 | Knoll et al. | 364/449 |
| 4,907,159 | 3/1990 | Mauge et al. | 364/436 |

FOREIGN PATENT DOCUMENTS

| | | | |
|---|---|---|---|
| 2615797 | 10/1977 | Fed. Rep. of Germany | 340/905 |
| 3536820 | 4/1987 | Fed. Rep. of Germany . | |
| 3633881 | 4/1988 | Fed. Rep. of Germany . | |
| 3806842 | 9/1989 | Fed. Rep. of Germany . | |
| 2554618 | 5/1985 | France . | |
| 2050767 | 1/1981 | United Kingdom . | |

OTHER PUBLICATIONS

Peter Brägas, "With Traffic Guidance Systems against Total Traffic Collapse", Man Forum magazine, Jan. 1991, pp. 26–29, publ. by the Man Group, Munich, Germany.

Map of Area between Hildeshiem (Blaupunkt HQ) & Hamburg, West Germany.

Boretz, "Travel Pilot System Set for End-of-Year Debut," Automotive Electronics Journal, Jan. 29, 1990, p. 19.

Specifications of the Radio Data System RDS for VHF/FM Sound Broadcasting (Eur. Bdcastg. Union, Mar. 1984)—AU 263 Lib., also known as EBU Technical Standard 3244-E (60 pages).

*Primary Examiner*—Reinhard J. Eisenzopf

*Assistant Examiner*—Andrew Faile

*Attorney, Agent, or Firm*—Frishauf, Holtz, Goodman & Woodward

[57] ABSTRACT

A vehicular radio receiver with an RDS (Radio Data System) decoder for decoding digitally coded traffic announcements is improved by using short codes for common traffic problems in order to minimize the required transmission capacity. The receiver includes a database with, for example, 256 fields, each containing a short traffic problem description.

Transmission of the actual numerical values for the length of a traffic problem or for visibility in fog is dispensed with. Instead, defined standardized numerical information is stored in the same memory field as the short description of the traffic problem so that they can be retrieved together. Furthermore, a pre-determined staggering of the numerical values is provided so that the memory capacity, and the transmission capacity, does not increase unnecessarily.

6 Claims, 2 Drawing Sheets

FIG. 2

FACT OR EVENT REGISTER (1...256)

| a | c | b |
|---|---|---|
| 001 | | JAM |
| 002 | 1 KM | JAM |
| 003 | 2 KM | JAM |
| 004 | 4 KM | JAM |
| 005 | 6 KM | JAM |
| 006 | 10 KM | JAM |
| 007 | | JAM DUE TO ACCIDENT |
| 008 | 1 KM | JAM DUE TO ACCIDENT |
| 009 | 2 KM | JAM DUE TO ACCIDENT |
| 010 | 4 KM | JAM DUE TO ACCIDENT |
| 011 | 6 KM | JAM DUE TO ACCIDENT |
| 012 | 10 KM | JAM DUE TO ACCIDENT |
| 013 | | JAM DUE TO ACCIDENT; RIGHT LANE IS CLOSED |
| 014 | 1 KM | JAM DUE TO ACCIDENT; RIGHT LANE IS CLOSED |
| . | | |
| 020 | 1 KM | JAM DUE TO ACCIDENT; ROADWAY IS BLOCKED |
| 026 | 1 KM | JAM DUE TO CONSTRUCTION |
| . | | |
| 032 | 1 KM | STOP+GO TRAFFIC |
| . | | |
| 038 | 1 KM | STOP+GO TRAFFIC DUE TO HIGH TRAFFIC INFLUX |
| . | | |
| 034 | 1 KM | STOP+GO TRAFFIC DUE TO CONTRUCTION |
| . | | |
| 040 | BEWARE: | FOG WITH LESS-THAN-50-METER VISIBILITY |
| 041 | BEWARE: | FOG WITH LESS-THAN-100-METER VISIBILITY |
| 042 | BEWARE: | FOG WITH LESS-THAN-200-METER VISIBILITY |
| 043 | BEWARE: | FOG WITH LESS-THAN-300-METER VISIBILITY |
| 044 | BEWARE: | FOG WITH LESS-THAN-500-METER VISIBILITY |
| 045 | BEWARE: | WRONG-WAY-DRIVER; DRIVE ON RIGHT & DO NOT PASS |
| 046 | THE ANNOUNCED DANGER NO LONGER EXISTS | |
| 047 | THE ANNOUNCED HINDRANCE NO LONGER EXISTS | |
| 048 | BEWARE: | GLAZE OF ICE; CAREFUL DRIVING IS REQUESTED |
| 049 | HINDRANCE BY SNOWFALL; BEING CLEARED | |
| . | | |
| 256 | WATCH OUT! ANIMAL ON THE ROAD | |

VEHICULAR RADIO RECEIVER WITH STANDARD TRAFFIC PROBLEM DATABASE

This application is a continuation of application Ser. No. 07/459,141 filed Dec. 29, 1989 abandoned.

Cross-Reference to related U.S. Pat. Nos. and applications of Robert Bosch GmbH and its subsidiary Blaupunkt Werke GmbH, the disclosures of which are hereby incorporated by reference: U.S Pat. No. 3,949,401, HEGELER et al. issued Apr. 6, 1976, entitled FREQUENCY IDENTIFICATION CIRCUIT FOR BROADCAST TRAFFIC INFORMATION RECEPTION SYSTEMS;

U.S. Pat. No. 4,435,843, EILERS BRÄGAS, issued Mar. 1984;

U.S. Pat. No. 4,450,589, EILERS BRÄGAS, issued May 1984;

U.S. Pat. No. 4,499,603, EILERS, issued Feb. 1985;

U.S. Pat. No. 4,862,513, BRÄGAS, issued Aug. 29, 1989, entitled RADIO RECEIVER WITH TWO DIFFERENT TRAFFIC INFORMATION DECODERS;

U.S. Ser. No. 307,349, LUBER et al., filed Feb. 7, 1989, entitled POWER CONSERVING SYSTEM FOR RADIO ALERT RECEIVERS, now abandoned in favor of continuation application Ser. No. 622,385, filed Nov. 30, 1990, now U.S. Pat. 5,060,300, issued Oct. 22, 1991;

German Patent Disclosure DE-OS 39 03 468, LUBER et al., filed Feb. 6, 1989, to which U.S. Ser. No. 469,180 filed Jan. 24, 1990, corresponds;

German Patent Disclosure DE-OS 39 04 344, TEMPELHOF, filed Feb. 14, 1989, to which U.S. Ser. No. 468,703, filed Jan. 23, 1990, corresponds;

U.S. Ser. No. 447,578 [758], DUCKECK, filed Dec. 7, 1989, COMPUTATION-CONSERVING TRAFFIC DATA TRANSMISSION METHOD & APPARATUS; U.S. Ser. No. 447,165, BRÄGAS Duckeck, filed Dec. 7, 1989, DIGITAL TRAFFIC NEWS EVALUATION METHOD, now U.S. Pat. No. 5,065,452, issued Nov. 12, 1991;

U.S. Ser. No. 447,378, DUCKECK, filed Dec. 7, 1989, ENERGY-CONSERVING STAND-BY FUNCTION IN RADIO TRAFFIC REPORT RECEIVER;

U.S. Ser. No. 459,144, MARDUS, filed Dec. 29, 1989, based on German pending application P 37 24 516.3 now U.S. Pat. No. 5,095,532 issued Mar. 10, 1992

U.S. Ser. No. 459,147, DUCKECK & BRAGAS, filed Dec. 29, 1989, based on German pending application P 38 10 177.7, now U.S. Pat. No. 5,020,143, issued May 28, 1991:

U.S. Ser. No. 459,145, MARDUS, filed Dec. 29, 1989, based on German pending application P 38 10 178.5

U.S. Ser. No. 458,882, DUCKECK & BRÄGAS, filed Dec. 29, 1989, based on German pending application P 38 10 180.7

U.S. Pat. No. 4,888,699, KNOLL et al., issued Dec. 19, 1989 and its C-I-P, U.S. Ser. No. 452,677, KNOLL et al., filed Dec. 18, 1989;

CROSS-REFERENCE TO RELATED LITERATURE

European Broadcasting Union Technical Standard 3244-E, entitled SPECIFICATIONS OF THE RADIO DATA SYSTEM RDS FOR VHF/FM SOUND BROADCASTING (EBU Technical Centre, Brussels, Mar. '84, 60 pp.);

German Patent Disclosure DE-OS 38 06 842, KNOLL, published Sept. 14, 1989.

BACKGROUND OF THE INVENTION

The invention relates to a radio receiver having a decoder for decoding of traffic advisories received in digitally encoded form according to U.S. Pat. No. 4,862,513.

A decoder for traffic advisories adapted to process digital signals is known from German Unexamined Patent Disclosure DE-OS 35 36 820, BRAGAS AND BUSCH, published Apr. 16, 1987. The digital signals are obtained by demodulation of an auxiliary carrier which is broadcast by radio stations in conjunction with an FM radio program. Because this auxiliary carrier does not interfere with the normal radio program, it is possible to transmit digital signals with traffic advisories without interruption of the current radio program.

It has already been proposed in the cited reference to design standard texts in accordance with the formatting principle in which traffic advisories are put together and to store them in memories at the receiving end. It is then possible to read out the standard texts with the aid of the digital signals by addressing the memory places where they are stored and to display them accordingly, either acoustically or visually.

While a large amount of transmission capacity can be saved by storing standardized texts for factual information, this is not the case with numerical information. For this reason it had been provided to transmit factual information which also contained additional numerical values in such a way, that the numerical values are wholly transmitted in the respective transmission code and the remaining factual information only as addresses of memory fields or memory places in which texts are stored.

Because the digital transmission of traffic announcements allows frequent repetition or a large amount of traffic announcement transmissions, there is the possibility to transmit regional and super-regional traffic announcements via every transmitter of a transmitter network. However, because of the temporarily large amounts of traffic announcements during periods of high traffic, this may result in the repeat time intervals between repetitions becoming so long that timeliness can no longer be assured.

Furthermore, from the viewpoint of signal processing it is also very cumbersome to decode and process digital signals which have been cut up and distributed to several blocks within a transmission format.

THE INVENTION

It is an object of the invention to improve a vehicular radio receiver in such a way that it becomes possible to increase transmission capacity and to transmit related announcements as much as possible in continuous data blocks or cycles.

The invention is based on the knowledge that the informational value of numerical information is of subordinate value in traffic announcements. There can only be a rough estimate of the effects of these numerical values on the driver, anyway, since these effects are also affected by other factors.

It is not possible for the driver to easily conclude on the basis of the exact length of a tie-up by how many minutes or hours his driving time would be increased over the case where there is no delay. For this reason it is justified to restrict the numerical values to those the accuracy of which is approximately in the range of effects which might be deduced from a knowledge of the numerical values under the most advantageous conditions.

Even though comparatively little transmission capacity is required for numerical values, a ten-place binary data word is required for the transmission of numbers between 1 and 1000. This transmission capacity can be limited if the numerical values are assigned the same way as the factual information, because the band width common under these circumstances for the actually given numerical values is considerably less than the one per se possible.

It is provided in an improvement to store the factual information having varied numerical values by way of fixedly determined staggering of the numerical values. By means of this it is possible to realize a sufficiently exact indication of the numerical values contained in the factual information, which results in considerable savings in transmission capacity.

DRAWINGS

FIG. 1 is a block circuit diagram of a vehicular radio receiver in accordance with the invention, and FIG. 2 is a table from a memory print-out in accordance with an embodiment of the invention.

DETAILED DESCRIPTION

Figure 1:
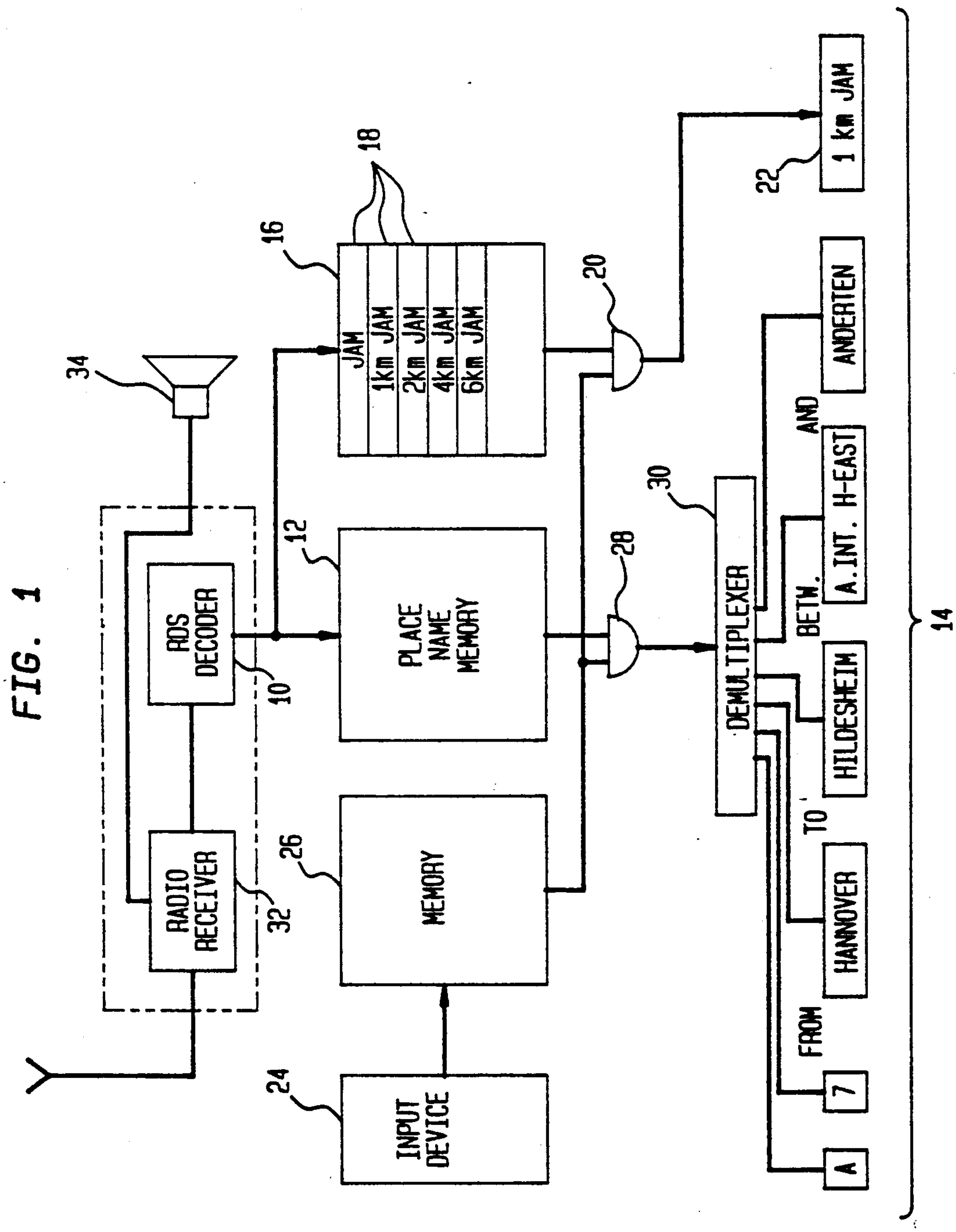

The vehicular radio receiver shown in FIG. 1 comprises a receiver element 32 with a loudspeaker 34 and a decoder 10 connected downstream of the receiver element. The decoder 10 decodes the digital traffic announcements and forwards the address words appearing at its output to memory devices 12 and 16. The memory device 12 is a memory for route-specific characteristics, such as place names, factual information is stored in the memory device 16, i.e. factual information without numerical values as well as factual information with numerical values. The numerical values are immediately associated with the factual information, so that only one memory field, which can be addressed by means of one address, is consumed by the factual information and numerical values. Place names are stored in the memory device 12, each place name occurring only once and occupying one of 65,536 memory fields. The numbers of route exits, for example exits of limited access highways, which are identified by the respective place name, are additionally stored in the memory places of the place names.

The unambiguous identification of a place is made possible by the output of an address which reads out one of the places stored in the memory device 12.

An input device 24 with a memory 26, downstream of which logic linking members 20 and 28 are placed, is used to delimit route-specific characteristics or factual characteristics. The logic linking members 20 and 28 are placed in lines leading to the visual output device 14. A demultiplexer 30 is placed downstream of the logic linking member 28, which sees to the distribution of the information for the display fields of the output device 14. However, the output of the logic linking member 20 directly leads to the display field 22.

If traffic announcements are transmitted, such as shown in the clear in the visual output device 14, those addresses reach he memory device 12, which sequentially cause the output of the data A7, Hannover, Hildesheim, Autobahn interchange Hannover-East and Anderten. Other addresses containing factual information cause the read-out of stored information from the memory device 16. In this memory device, factual information and, if necessary, additional numerical values are stored in memory fields 18. The numerical values are stored in fixedly determined staggered form. By means of this, the amount of traffic announcements having the same text, except for the numerical values, can be considerably limited.

In practice six or seven differing numerical values are sufficient, the staggering for the numerical values preferably being logarithmic, because staggering in this manner has proven to be logical in other physiological-technical areas. Meant by this is visual or acoustical sensation which detects changes practically only with the doubling or cutting in half of the corresponding physical values.

It has been considered to be practical to store factual information normally associated with numerical values also without numerical values. By means of this it is possible, for example, to include a case where a particularly advantageous numerical value needs to be inserted. There is also the possibility, when information regarding numerical values is incomplete or missing, to avoid the inclusion of random numerical values which might undermine the confidence of the driver in the truthfulness of the traffic announcements.

With traffic announcements sent as clear (uncoded) text, identical information may, to some extent, be worded several different ways. Not only would this require considerable memory space if this factual information were to be stored directly in the memory device 16, but it would also considerably increase the required length of the data word used for addressing.

Therefore, so as not to cause an overflow in the variation of possible traffic announcements, standardization is performed and also a selection is made from the total of traffic advisories transmitted in each case by only considering those traffic advisories which statistically occur most often.

The number of bits available for traffic announcements is limited in the RDS system, because this system is also intended to transmit other announcements. For route-specific characteristics, such as place names, eight bits are available, while eight more bits are assigned for the remainder of the factual information. By means of the 256 different addresses, which correspond to eight bits, it is possible to encode the same amount of factual information. The amount can be divided, for example, into 30 texts with numerical values which are each stored six times with a fixed number, and 76 reports without a numerical value.

One advantage of the assignment of the factual information (with or without numerical values) to a single respective memory location is that the devices at the transmitter end, with which the traffic announcements are coded, need not concatenate different factual detail strings. By means of this, a source of errors is eliminated which, for example, might lead to non-sensical results when linking factual information from different sources.

The invention permits the call-up in a single cycle of addresses for the memory device 12 as well as those for the memory device 16. This avoids the problem of interim storage of information distributed over a plurality of data cycles and then having to re-combine it.

FIG. 2 shows a memory print-out of the factual information or event register provided with 256 addressable memory fields. Addresses by means of which memory places can be called up and read out can be found under a. Factual information is designated by b, while c represents the numerical values.

As shown in the drawings, the factual information is repeated in different memory fields which are variably addressable. In contrast thereto, the associated distance parameter values c vary.

If a selection is to be made in traffic announcements displayed via the display device 14, it is possible to store by means of the input device 24, for example, a place name or other criteria or characteristics for selection among factual information in the memory 26. The logic gate or linking members 28 and 20 suppress the display of traffic announcements until traffic announcements are received which exactly fit the selected characteristics.

While this added device for selecting route-specific characteristics is in practical use very important so as not to distract the driver from the actual traffic by a flood of traffic announcements, the selection of factual information should be considered to be an additional operational option. However, the selection of factual information is conceivable in those cases, where by its use other localities or routes are made known which the driver originally intended to traverse with the idea of averting traffic obstructions occurring on his route.

Various changes and modifications may be made, and features described in connection with any one of the embodiments may be used with any of the others within the scope of the inventive concept.

We claim:

1. A radio receiver having;

a decoder (10) for decoding traffic announcements including traffic problem codes received in digital form, at least one memory device (12, 16) adapted to contain both a plurality of items of factual information (b) and route specific characteristics, wherein said items of factual information respectively correspond to said traffic problem codes, means (14), connected to an output of said decoder, for interpreting said traffic problem codes and retrieving corresponding traffic announcement information from said at least one memory device (12, 16) and indicating it to a vehicle operator by at least one of visual and acoustical indications, wherein each of said items of factual information (b) corresponding to the traffic problem code is stored, together with any numerical values (c) quantifying a distance parameter of the traffic problem, at a single respective address in said at least one memory device, thereby facilitating compact transmission of said traffic problem code and rapid retrieval of the hems of factual information; and each of said items of factual information (b) provided with the distance parameter numerical values (c) is also identically stored again in said at least one memory device without the numerical values.

2. A radio receiver in accordance with claim 1, wherein, in order to conserve memory in said receiver, each of said item of factual information is (b) is stored in said at least one memory device (12, 16) with only a subset of said distance parameter numerical values that are physically possible, each value representing at least one of visibility distance and geographic length of a traffic problem.

3. A radio receiver in accordance with claim 2, wherein the numerical values (c) in said subset are staggered in approximately logarithmis steps.

4. A radio receiver in accordance with claim 1, wherein the factual information (b) and the numerical values (c) stored in said at least one memory device are selected from information and values in traffic announcements which have been actually transmitted in the Radio Data System (RDS) specified by the European Broadcasting Union.

5. A radio receiver in accordance with claim 1, wherein said route-specific characteristics include 256 place names associated with 28 variably addressable memory fields;

said factual information (b) includes 256 pieces of factual information associated with 28 variably addressably memory fields (18), in such a way that a transmitted address word of 32 bits encompasses a complete traffic announcement comprising place information and factual information.

6. A radio receiver in accordance with claim 1, further comprising an input device (24) for entering selection criteria specifying which of said items of factual information (b) received should be output for consideration by said vehicle operator;

a further memory device (26), having an input connected to an output of said input device, for the storage of said selection criteria for said factual information; and a logic gate (20), having an output connected to a display means (22), and having a plurality of inputs, connected respectively to outputs of said at least one memory device (16) which contains said traffic problem codes, and of said further memory device (26), thereby permitting suppression of output of said items of factual information which fail to match said selection criteria, thus sparing said vehicle operator from irrelevant information.

* * * * *